UNITED STATES PATENT OFFICE.

HEINRICH WINTER, OF HAMBURG, GERMANY.

PROCESS OF AMELIORATING THE TASTE OF COFFEE.

997,431.  Specification of Letters Patent.  Patented July 11, 1911.

No Drawing.  Application filed March 25, 1910.  Serial No. 551,543.

*To all whom it may concern:*

Be it known that I, HEINRICH WINTER, a subject of the German Emperor, and a resident of Hamburg, Germany, have invented certain new and useful Improvements in the Process of Ameliorating the Taste of Coffee, of which the following is a specification.

The subject matter of my invention is a method of improving the taste of coffee.

Various kinds of coffee are frequently found in the market which are faultless in appearance and nature, but after being roasted have a peculiar, very bitter taste and therefore can be sold less readily in spite of their other good qualities. These kinds which experts term "hard" can have the "hard" taste entirely removed from them by the method forming the subject matter of my invention, and they can be given a normal, mild taste and powerful aroma.

My method consists in bringing the beans of such coffees in their green or raw condition into contact for a long time with a moderately concentrated solution of sugar, whereby the same swell and absorb the solution. I take only so much of the latter as is absorbed by the coffee, because otherwise, reversely, the beans would be lixiviated. The beans are agitated from time to time in order to distribute afresh over them the liquid which is not entirely absorbed at first. Obviously, the liquid can be drawn off from below by a pump or the like and supplied again to the beans until it is all absorbed or can be distributed over the beans several times in small portions, each time allowing the beans to absorb it. The employment of a vacuum accelerates the absorption but is not necessary.

The quantity of the saccharine solution and the time of the swelling are dependent on the nature of the coffee and on the concentration of the solution. The swelling can be accelerated when the described treatment takes place at a temperature slightly below 100° C. At the ordinary temperature the beans absorb in 10 to 12 hours, 20 to 25% of their weight of a sugar solution of a strength of from 25 to 50%. This corresponds to an absorption of sugar of from 5 to 12% of the weight of the coffee which however is almost completely destroyed during the process of roasting. At a higher temperature, for instance at 99° C., the same quantity of sugar will already be absorbed in about two hours. The temperature must never rise above 100° C. because then an evaporation of the water of the sugar solution would take place and the beans would only be incrusted contrary to the present invention which requires that the beans are impregnated with the sugar solution. The absorption of the solution is made easier by the application of a partial vacuum, but this is not necessary. The coffee thus treated can now be roasted at once or be previously dried in order to diminish the work of the roasting plant, and after being roasted has a strikingly mild and aromatic taste in comparison with the same coffee which was not subjected to the described treatment.

Pure cane sugar and grape sugar are most suitable for carrying my method into practice, nevertheless the desired action is obtained also by means of invert-sugar, levulose, milk-sugar and dextrin. In case the latter is used, it is necessary to wash the beans after the absorption is completed and before roasting. Slight variations in the process are required for various kinds of coffee which are easily determined by those skilled in the art. My method is most effective when applied to "hard" coffees but it may also be used to great advantage with other kinds of coffees.

Examples.

Two examples are given below, one for the simplest method of carrying out the invention (*a*) for which no special mechanical devices are required and a second one (*b*) illustrating the quickest method in which a drum is used which may be heated.

Example *a:* 100 lbs. of old Bahia-coffee are treated with 5 lbs. of a solution containing 1½ lbs. of sugar in 3½ lbs. of water. The solution is applied by spraying it over the beans, then the beans are thoroughly turned by means of shovels so that they become uniformly moist. This turning of the beans is repeated every half hour. After three hours when the beans appear to be almost dry, another quantity of 5 lbs. of the same sugar solution is sprayed thereon and the beans are again turned every half hour. This is repeated twice again so that the coffee after twelve hours has absorbed 20 lbs. of sugar solution or 6 lbs. of sugar and still the beans appear to be dry on the surface. The coffee thus treated is now directly roasted.

Example b: 100 lbs. of Santos-coffee are placed into a closed, rotatable drum which is provided with a heating mantle into which steam of one atmosphere tension is introduced. The outlet for the condensation water is so arranged that always ⅓ of the heating mantle remains filled with condensation water. The temperature of the contents of the drum accordingly can never rise above 100° C. Now 10 lbs. of a solution containing 3 lbs. of grape sugar in 7 lbs. of water are introduced into the drum, the steam turned on and the drum slowly rotated. After ½ hour a like quantity of solution is added and then twice again the same quantity after the drum has been rotated for half an hour at a time. Thus in two hours the coffee has absorbed 12 lbs. of sugar and is first completely dried in a kiln and then roasted.

It is true it is well known to add sugar to coffee toward the end of the roasting operation or after the roasting; in this manner, however, it is solely a matter of coating or candying the beans with a layer of melted and carmelized sugar. The coating is for protecting from too rapid volatilization the aroma of the coffee as formed from the aromatic constituents of the beans when roasted and to impart to the beans a pleasing appearance. It is obviously impossible to influence the changes which take place in the interior of the beans during the process of roasting. When treated according to my method, however, the sugar or the like incorporated in the beans before the roasting participates from the very beginning in the roasting process just like the natural sugar of the coffee and has the same action in the formation of the aroma and the same influence of the final taste which the natural sugar in the beans has during the process of roasting, although it, like this, is destroyed for the most part, as such, under the action of the heat or is converted into other caramel-like and volatile substances.

I do not claim the coating of coffee beans with a layer of sugar or sugar-like substances for polishing or preserving purposes but

What I claim is:

1. The process of ameliorating the taste of coffee beans consisting in treating the raw coffee with a moderate quantity of a sugar solution, allowing the raw beans to absorb said solution completely, and afterward roasting the beans.

2. The process of ameliorating the taste of coffee consisting in treating the raw coffee beans several times with small portions of a sugar solution, each time allowing the raw beans to absorb said solution completely, and afterward roasting the beans.

3. The process of ameliorating the taste of coffee consisting in treating the raw coffee beans with a moderate quantity of a sugar solution, allowing the raw beans to absorb said solution completely, drying the beans, and finally roasting same.

4. The process of ameliorating the taste of coffee consisting in treating the raw coffee beans with a moderate quantity of a sugar solution, agitating the beans from time to time, allowing the raw coffee beans to absorb said solution completely, drying the beans, and finally roasting same.

5. The process of ameliorating the taste of coffee consisting in treating the raw coffee beans with a moderate quantity of a sugar solution at a temperature below 100 degrees Celsius, allowing the raw beans to absorb said solution completely, and afterward roasting the beans.

6. The process of ameliorating the taste of coffee consisting in treating the raw coffee beans several times with small portions of a solution of pure dextrose at a temperature below 100 degrees Celsius, each time allowing the beans to absorb said solution completely and agitating the whole from time to time, then allowing the beans to dry and finally roasting same.

Signed at Hamburg this 17th day of March, 1910.

HEINRICH WINTER.

Witnesses:
ERNEST H. L. MUMMENHOFF,
OTTO W. HELLMRICH.